United States Patent Office 3,508,869
Patented Apr. 28, 1970

3,508,869
NOVEL CRYSTALLINE Mg(OH)₂ AND MgO AND METHODS OF PREPARATION
Robert J. Shoaff, Lake Jackson, Tex., assignor to The Dow Chemical Company, Midland, Mich., a corporation of Delaware
No Drawing. Filed Nov. 4, 1966, Ser. No. 591,987
Int. Cl. C01f 5/08, 5/20
U.S. Cl. 23—201
10 Claims

ABSTRACT OF THE DISCLOSURE $Mg(OH)_2$ crystals hexagonal in form and 15 to 3000 microns in length and width and about 700 angstrom units in thickness are formed by precipitation from an aqueous solution of a water soluble magnesium salt at a temperature above about 300° C. with a nitrogenous base. MgO having length and width of 10–3000 microns and a thickness of about 700 angstrom units can be made by calcining the $Mg(OH)_2$.

---

This invention relates to novel crystalline forms of $Mg(OH)_2$ and MgO and to the methods of their preparation, and more particularly pertains to essentially hexagonal platelets of $Mg(OH)_2$ from which hexagonal platelets of MgO can be produced, and to methods for preparing the hexagonal crystalline structures which method comprises precipitating $Mg(OH)_2$ from an aqueous solution of a water-soluble magnesium salt at a temperature above 300° C. with a nitrogenous base. The crystalline MgO can be prepared by calcining the crystalline $Mg(OH)_2$.

The usual procedure for preparing $Mg(OH)_2$ is to add a water-soluble alkaline material to an aqueous solution of a magnesium salt at atmospheric pressure or slightly above and temperatures from slightly above room temperature to about 100° C. or slightly higher. The precipitate which forms is gelatinous in nature and on standing forms very small crystals whose largest dimension does not exceed about 5 microns and whose thickness is in the range of from about 300 to about 900 angstrom units.

The $Mg(OH)_2$ crystals of this invention have a hexagonal configuration and a thickness considerably lower than their length or width. The thickness of the crystals of this invention is about 700 A.; the length varies from about 15µ to about 3000µ, and the width from about 15µ to about 3000µ. The size of the crystals can be controlled, to a great extent, by varying the degree of agitation; i.e., the 15µ crystals were made using good agitation, while the 3000µ crystals were made using no agitation.

When the $Mg(OH)_2$ crystals of this invention are calcined to MgO, at temperatures of 400–1700° C., preferably about 800° C. to about 1700° C., the MgO has a hexagonal form with a thickness of about 700 angstrom units. The length of the MgO crystals ranges from about 10µ to about 3000µ and the width runs between about 10µ and about 3000µ.

The method of making the novel crystalline form of $Mg(OH)_2$ comprises heating an aqueous solution of a water-soluble magnesium salt to a temperature above 300° C. and preferably above 320° C. and adding $NH_3$ or a water-soluble amine to the solution under pressure until the precipitation of $Mg(OH)_2$ is substantially complete. The amount of $NH_3$ or amine needed is at least a stoichiometric amount, but in order to insure complete precipitation of the $Mg(OH)_2$ a slight excess of the $NH_3$ or amine is usually added. Less than the stoichiometric amount of $NH_3$ or amine can be employed at the expense of lower yield of $Mg(OH)_2$ crystals.

There is no known upper limit of temperature and pressure for making the novel $Mg(OH)_2$ crystals, but for practical and economical purposes, it is not necessary to operate at temperatures above about 400° C. The sole limiting temperature condition is that at which ammonia or the amine decomposes under the pressure conditions employed.

Any magnesium salt which is soluble in water can be used for making $Mg(OH)_2$ of this invention by the procedure defined above. Representative inorganic magnesium salts are $MgF_2$, $MgCl_2$, $MgBr_2$, $MgI_2$, $MgBrO_3$, $MgBrO_4$, $MgClO_3$, $MgClO_4$, $MgCrO_4$, $MgFeO_4$, $MgSO_4$, $MgSO_3$, $MgS_2O_3$, $Mg(MnO_4)_2$, $MgMoO_4$, $Mg(NO_3)_2$. Magnesium salts of organic acids, including those of fatty acids having from 1 to about 6 carbon atoms, such as magnesium formate, acetate, propionate, butyrate, pentanoate, hexanoate, citrate or salts of aromatic acids such as magnesium benzoate, salicylate and phthalate can be employed.

The preferred magnesium salts are those of the sulfuric, nitric and hydrochloric acid, the most preferred salt being $MgCl_2$, because of its ready availability from sources all over the world.

Besides $NH_3$, typical amines that can be employed are methyl amine, ethyl amine, propyl amine, ethylene diamine or any other aliphatic amine which does not decompose, is volatile at the temperature and pressure conditions employed and is alkaline in aqueous systems.

If desired the $NH_3$ or amine or mixtures thereof can be added to the salt solution in aqueous media under pressure. It is preferred to use $NH_3$, because of its low cost, ready availability and its ease of introduction into the solution of magnesium salt.

The unique nature of this method for making the novel $Mg(OH)_2$ is shown by the fact that a temperature above 300° C., and preferably about 320° C., amonia or a water-soluble amine either in relatively pure form or as an aqueous solution must be used to provide the requisite alkalinity to the aqueous magnesium salt solution. In comparative tests run at 290° C. with the addition of ammonia at a pressure of 4000 p.s.i.g. to a 10% by weight solution of $MgCl_2$, the novel crystalline $Mg(OH)_2$ was not formed. Similarly, addition of NaOH or a mixture of NaOH and $NH_4Cl$ to a 10 weight percent solution of $MgCl_2$ in water at a temperature of 350° C. and 2300 p.s.i.g. the novel crystalline forms of $Mg(OH)_2$ did not form.

The examples which follow are intended to illustrate the invention, not to limit it. All parts are by weight, unless otherwise specifically indicated.

EXAMPLE 1

500 ml. of a 10 weight percent solution of $MgCl_2$ in water were placed in an autoclave equipped with a stirrer. The temperature of the solution was raised to 350° C. At this temperature the autogenous pressure was about 2200 p.s.i.g. Ammonia from a cylinder was fed into the autoclave by means of a pump until the pressure in the autoclave was 4500 p.s.i.g. The ammonia feed was then stopped and the temperature in the autoclave was permitted to drop until it reached room temperature. The contents of the autoclave were filtered on buchner funnel, washed with water and dried in an oven at 130° C. A yield of 27 g. of hexagonal platelets of $Mg(OH)_2$ having the following dimensions: ca. 700 A. thick and 15–100µ long and 15–100µ wide, were obtained. This was an 82% yield.

EXAMPLE 2

In this run 500 ml. of a 10 weight percent $MgCl_2$ solution was placed in the autoclave described in Example 1 and the temperature was raised to 320° C. At this temperature the autoclave had a p.s.i.g. of about 1800. Ammonia from a cylinder was then pumped into the autoclave until a p.s.i.g. of 3000 was reached. The ammonia feed was then shut off and the autoclave was permitted to cool to room temperature. The $Mg(OH)_2$ crystals were filtered and dried as described in Example 1. $Mg(OH)_2$ crystals were very thin hexagonal platelets within the range of 15–3000 microns.

EXAMPLE 3

This run was made by following the procedure described in Example 1, with the exception that the temperature was raised to 370° C. before pumping $NH_3$ into the autoclave. A p.s.i.g. of 4500 was reached before ammonia was shut off, and the autoclave was allowed to cool to room temperature. The $Mg(OH)_2$ crystals were thin and hexagonal.

EXAMPLE 4

A part of the $Mg(OH)_2$ obtained in Example 2 was calcined to MgO by heating to 800° C. for 15 minutes. After cooling the crystals were observed to retain their hexagonal, extremely thin structure.

The novel crystalline form of $Mg(OH)_2$ can be used as a substitute for normal $Mg(OH)_2$, in many instances, in any application in which high porosity, low density periclass is desirable.

A 15-gram pellet made from the $Mg(OH)_2$ crystals of this invention by compressing the powder at 15,000 p.s.i. had a density of 1.5 grams per cc. After heating at 1700° C. for 1 hour, the pellet had a density of 1.77 grams per cc. The volume of the pellet was reduced only about 40% during the heating step, as compared to a volume reduction of 67–70% for $Ca(OH)_2$ precipitated $Mg(OH)_2$. The strength of the fired pellet was such that it required a blow from a hammer to break it.

Photographs of polished sections of pellets show that there is very little if any growth at grain boundaries. This property contrasts with the MgO from fine crystals of $Mg(OH)_2$ available heretofore. These show extensive growth at grain boundaries.

In other calcining tests it was shown that the large hexagonal crystals of this invention can be completely converted to MgO by heating at 400° C. for 2 hours. Only about 85% of the fine crystals of $Mg(OH)_2$ are converted to MgO under the same calcining conditions.

An aqueous slurry of 3–5% of the $Mg(OH)_2$ crystals in water is extremely viscous. Thus, the uncalcined crystals can be used as thickening agents.

I claim:

1. $Mg(OH)_2$ having a hexagonal platelet configuration with a thickness of about 700 A., a length of from about 15µ to about 3000µ and a width of from about 15µ to about 3000µ.

2. MgO having a hexagonal platelet configuration with a thickness of about 700 A., a length of from about 10µ to about 3000µ and a width from about 10µ to about 3000µ.

3. A method for preparing hexagonal platelets of $Mg(OH)_2$ comprising, adding sufficient water soluble nitrogenous base selected from the class consisting of $NH_3$, methyl amine, ethyl amine, propyl amine and ethylene diamine at a temperature of at least 300° C. to an aqueous solution of a water-soluble magnesium salt to precipitate $Mg(OH)_2$.

4. The method of claim 3 in which the magnesium salt is a magnesium halide.

5. The method of claim 4 in which the salt is $MgCl_2$.

6. The method of claim 3 in which the temperature is above 320° C. and below the decomposition point of the nitrogenous basic.

7. The method of claim 3 in which the nitrogenous base is ammonia.

8. The method of claim 7 in which the amount of $NH_3$ added is at least a stoichiometric quantity required to react with the magnesium salt to form $Mg(OH)_2$.

9. The method of claim 3 in which $NH_3$ is the nitrogenous base and $MgCl_2$ is the salt in solution.

10. A method of making MgO comprising calcining the $Mg(OH)_2$ having the properties defined in claim 1, said MgO having a high porosity and low density.

References Cited

UNITED STATES PATENTS

| 1,986,509 | 1/1935 | MacIntire | 23—201 |
| 2,659,661 | 11/1953 | Keitel | 23—201 |

FOREIGN PATENTS

| 530,364 | 9/1956 | Canada. |
| 205,078 | 1925 | Great Britain. |
| 626,503 | 7/1949 | Great Britain. |
| 837,023 | 6/1960 | Great Britain. |

OTHER REFERENCES

Chem. Ab. I, Garrido, vol. 46, 8926e, October 1952.

Chem. Ab. II, Hine et al., vol. 57, 10768g, October 1962.

OSCAR R. VERTIZ, Primary Examiner

G. T. OZAKI, Assistant Examiner

U.S. Cl. X.R.

252—317